June 17, 1958

W. F. SIMPKINS

INTERLOCKING MEANS FOR MOUNTING DECK AND WALL BOARDS IN A VEHICLE BODY 2,839,327

Filed Dec. 31, 1956

Walter F. Simpkins
INVENTOR.

BY Clarence A. O'Brien and Harvey B. Jacobson
Attorneys

June 17, 1958 W. F. SIMPKINS 2,839,327

INTERLOCKING MEANS FOR MOUNTING DECK AND WALL BOARDS IN A VEHICLE BODY

Filed Dec. 31, 1956 3 Sheets-Sheet 2

Walter F. Simpkins
INVENTOR.

BY Clarence A. O'Brien and Harvey B. Jacobson
Attorneys

June 17, 1958 W. F. SIMPKINS 2,839,327

INTERLOCKING MEANS FOR MOUNTING DECK AND WALL BOARDS IN A VEHICLE BODY

Filed Dec. 31, 1956 3 Sheets-Sheet 3

Walter F. Simpkins
INVENTOR.

BY Clarence A. O'Brien and Harvey B. Jacobson
Attorneys

United States Patent Office 2,839,327

Patented June 17, 1958

2,839,327

INTERLOCKING MEANS FOR MOUNTING DECK AND WALL BOARDS IN A VEHICLE BODY

Walter F. Simpkins, Jonesboro, Ark., assignor of twenty-five percent to Frank Snellgrove, Jonesboro, ten percent to Arvel L. Wall, Bay, twenty-one and two-thirds percent to George P. Simpkins, Jonesboro, and twenty-one and two-thirds percent to Mary Elizabeth Thompson, Marked Tree, Ark.

Application December 31, 1956, Serial No. 631,804

7 Claims. (Cl. 296—24)

My invention relates to means for mounting deck and wall boards in truck trailer bodies and is designed as an improvement over the deck and wall board equipment disclosed in my copending application Serial No. 629,008, filed December 18, 1956.

The primary object of my invention is to provide fasteners extending from the ends of the boards and bayonet slot means on a trailer truck body interlocking to securely anchor the boards in deck and wall forming position against bouncing or rattling.

Other and subordinate objects together with the precise nature of my improvements will become readily apparent when the following description and claims are read with reference to the accompanying drawings in which:

Figures 1, 3, 9, 10, 11:
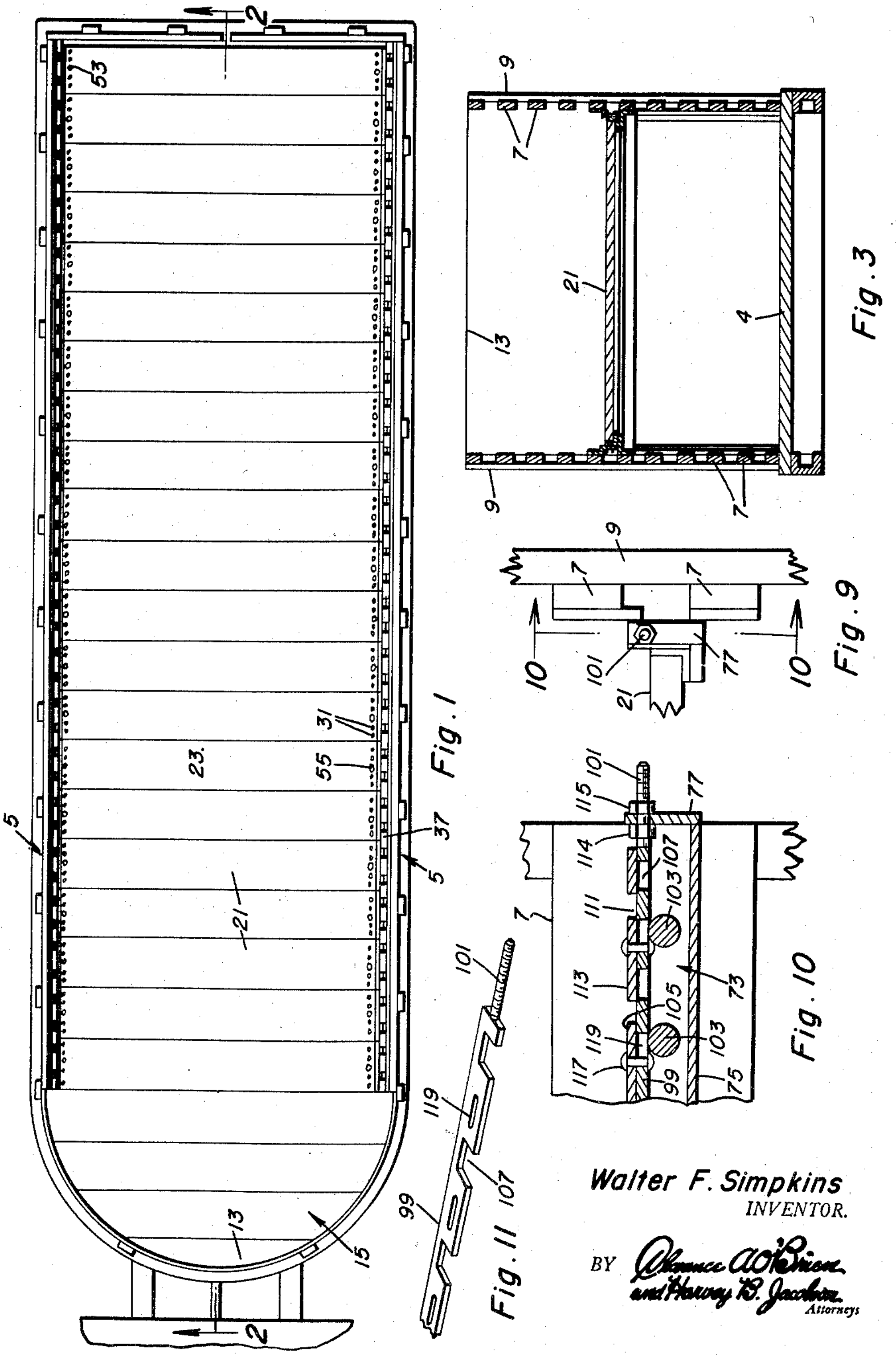
Figure 1 is a top plan view illustrating my invention in a preferred embodiment thereof with the boards in deck forming position.
Figure 3 is a view in vertical cross-section taken on the line 3—3 of Figure 2.
Figure 9 is a fragmentary enlarged view in rear elevation of a modified embodiment of the invention.
Figure 10 is a fragmentary view in vertical section taken on the line 10—10 of Figure 9.
Figure 11 is a fragmentary view in perspective of a locking slide bar forming part of the modified embodiment.
Figure 2:
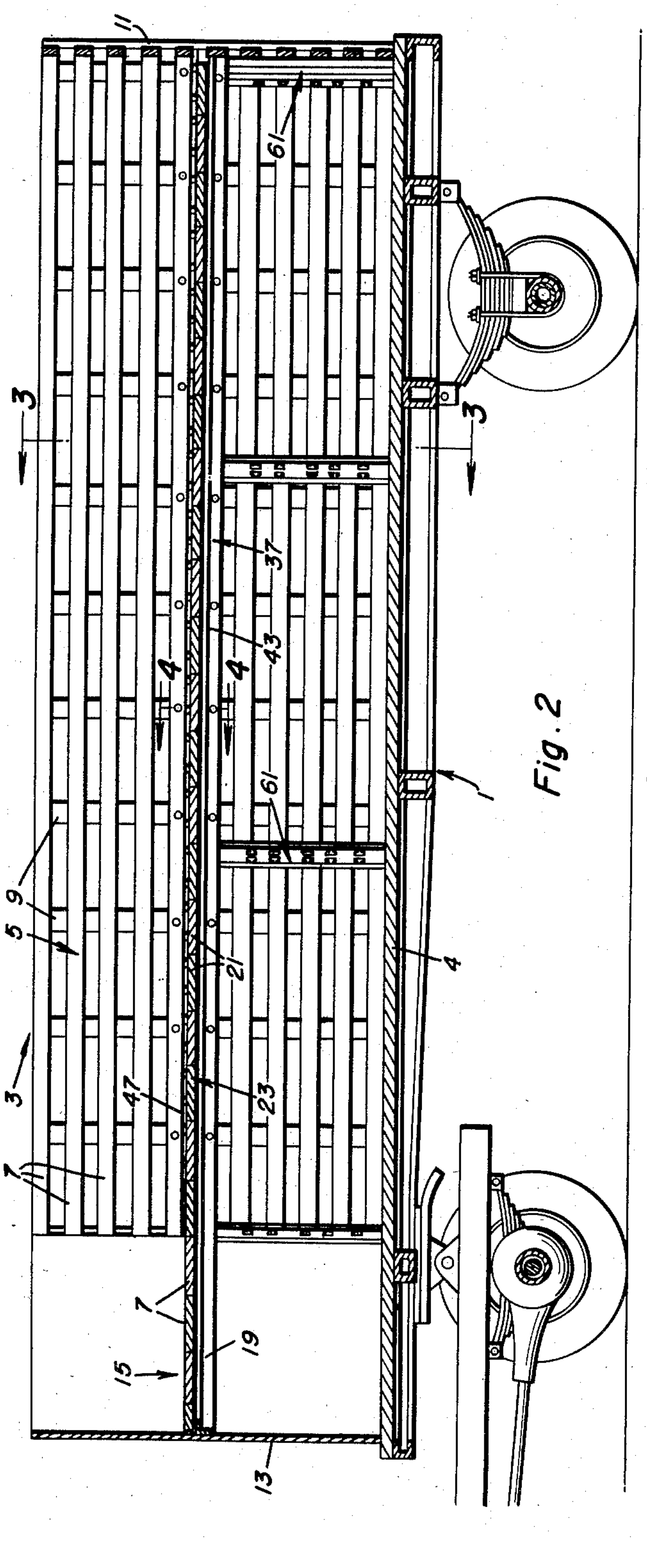
Figure 2 is a view in vertical longitudinal section taken on the line 2—2 of Figure 1.

Referring to the drawings by numerals my invention has been shown therein as embodied in a conventional truck trailer having a chassis 1 supporting a body 3 having a bed 4, sides 5 of longitudinal slats 7 and stakes 9, a slat tailgate 11 and a semi-circular solid front end 13 having therein a semi-circular supplemental front deck section 15 of graduated planks 17 supported on a semi-circular bar 19 in said end 13.

My improved mounting means is concerned with a set of boards 21 which, as in my copending application, are proportioned as regards length and width relative to the width of the body 3 and of the tailgate 11 to form a main deck 23 of the set with the boards 21 extending transversely between the sides 5 from the deck section 15 to the tailgate 11, or to form with the set a wall of three sections 25 on each side 5 and a single wall section 27 in the tailgate providing with the bed 4 a bin in the body 3 with the boards 21 in the walls 25, 27 of like number stacked on edge.

For mounting the set of boards 21 in deck formation said boards 21 are provided with transverse angle bars 29 on their ends suitably riveted thereto, as at 31, and forming bottom runners thereon, and are also provided on said ends with a pair of headed studs 33 spaced along said ends and extending outwardly of the angle bars 29 and suitably secured to the angle bars as by welding 35.

A pair of elongated support bars 37 in the body 5 are bolted, as at 39, to adjacent slats 7 through selected stakes 9 in horizontally extending position. The bars 37 are each formed with a central longitudinal projecting hollow rib 41 facing inwardly of the body 3 and with a lateral horizontal ledge 43 at the bottom of the rib 41 and extending inwardly of the body 5. The boards 21 fit endwise between the ribs 41 with the angle bars 29, or runners slidable against said ribs 41 and on and slidably supported on the ledges 43. Pairs of rectangular slots 45 spaced apart in correspondence with the spacing of the studs 33 are provided in top sides 47 of the ribs 41 and which open into bayonet slots 49 in the front side 51 of said ribs 41. The studs 33 interlock with the bayonet slots 47 when the boards are slid forwardly relative to the ribs 41.

To position the boards 21 in deck formation, said boards are shoved forwardly successively, beginning with the first board with the studs 33 sliding forwardly on the ribs 41 between slots 45 until the pairs of studs fall through successive pairs of the slots 45 into the complemental slots 49 at which point they rest on the ledges 43 and may be slid forwardly on the ledges 43 to enter the studs 41 in the front ends of said slots 49 to interlock therewith.

Figure 4:
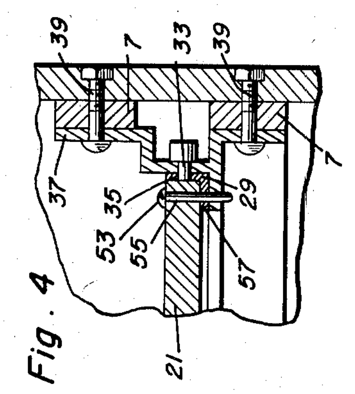
Figure 4 is an enlarged fragmentary view in vertical cross-section taken on the line 4—4 of Figure 2.
Figure 5:
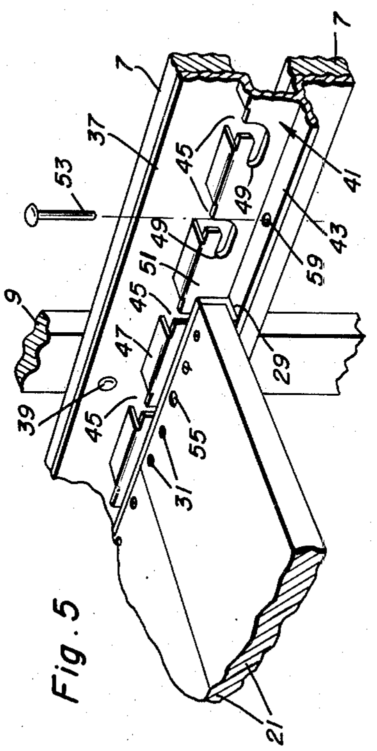
Figure 5 is an enlarged fragmentary view in perspective partly in section of the boards in deck forming position.

A headed pin 53 is provided for insertion through apertures as at 55 in the ends of the rearmost board 21 and through suitable apertures 57, 59 in the angle bars 29 of said board and the ledges 43 as shown in Figures 4 and 5 to lock the boards 21 in forwardly slid deck formation.

Figure 6:
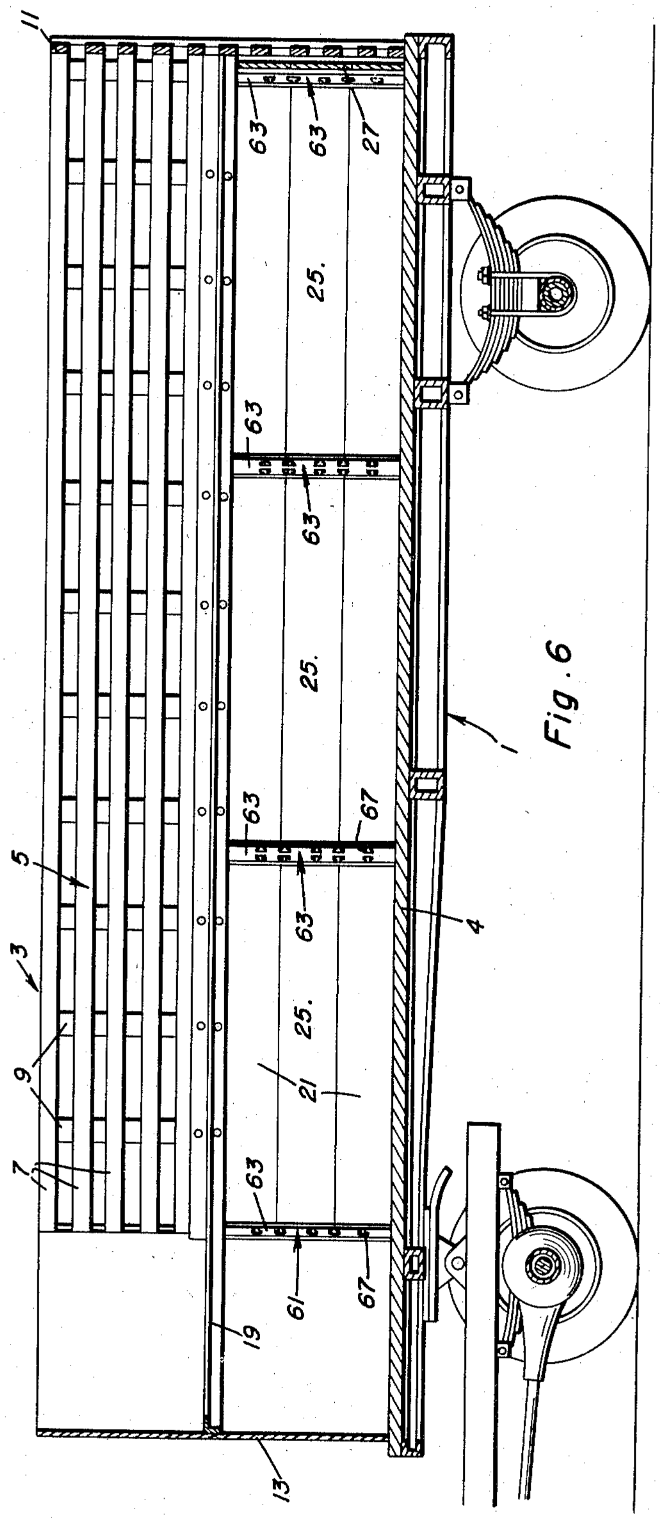
Figure 6 is a view in vertical longitudinal section taken on the same line of Figure 1 as Figure 2 and illustrating the boards in wall forming position.
Figure 8:
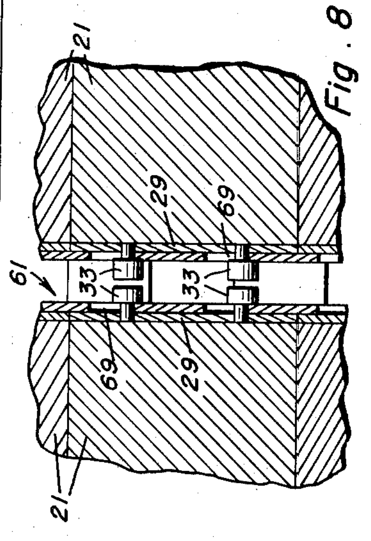
Figure 8 is an enlarged view in vertical longitudinal section taken on the line 8—8 of Figure 7.
Figure 7:
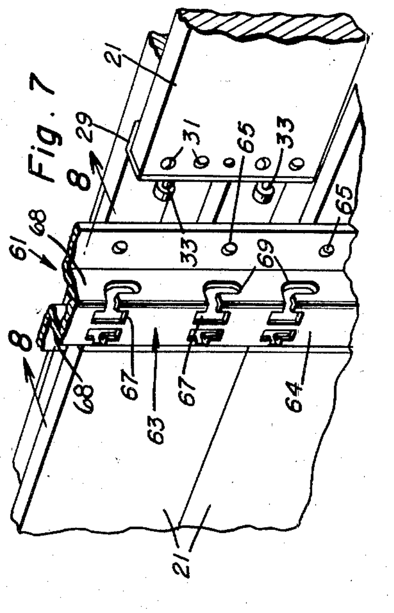
Figure 7 is an enlarged fragmentary view in perspective partly in section of the boards in wall forming position.

For mounting the set of boards 21 in wall formation vertical support bars 61 each formed with a central forwardly projecting hollow rib 63 bolted, as at 65, at opposite sides of the rib 63 to the sides 5 and to the tailgate 11 within the body 3 and with the ribs 63 facing inwardly of said body and opening outwardly of said body. The bars 61 are spaced apart along said sides 5 and tailgate 11 so that the boards 21 fit endwise between the ribs 63 to form a wall of three sections 25 with three boards 21 in each section on the sides 5 as shown in Figure 6 and a single wall section 27 of three boards on the tailgate 11.

The ribs 63 are provided with slots 67 in front sides 64 thereof opening into bayonet slots 69 in other sides 68 of said ribs 63 corresponding to the slots 45 and the bayonet slots 49 of the ribs 41 except that the bayonet slots 69 have lower ends lowermost instead of foremost as in the case of the bayonet slots 49. As will be clear in mounting the boards 21 in wall formation the headed studs 33 are inserted in the slots 67 to enter the same in the bayonet slots 69 for interlocking with bayonet slots 69 by downward sliding of said boards against the sides 68 of the ribs 63.

In the modified embodiment shown in Figures 9, 10, 11 for mounting the boards in deck formation support bars, one of which is shown at 73, are provided corresponding to the support bars 37 except that the ribs 75 corresponding to the ribs 41 are provided with closed ends as at 77 and a notched locking holddown bar 99 is slidably mounted in said ends as by threaded terminal stems, one of which is shown at 101, so that said bar extends through the rib 73 between the studs 103 and the top side 105 of the rib.

The locking holddown bar 99 has side edge notches 107 therein arranged so that when said bar 99 is slid in one direction, said notches 107 will underlie and register with the slots 111 in the top side 105 of the rib 73 corresponding to the slots 43 and whereby the studs can be entered in said slots 111. When said locking holddown bar 99 is slid in the opposite direction it will close the slots 111 and lock the studs 33 in place.

Nuts 114, 115 are threaded on the terminal tail stem 101 of said bar 99 for turning therein to slide and lock said bar 99 in locking holddown position. Rivet head studs 117 extending through the top side 105 of the rib 73 and through longitudinal slots 119 in said bar 99 guidingly support said bar 99 between its ends against chattering.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Means for mounting boards in deck and wall formation in a truck body having sides, said means comprising a pair of bars secured horizontally to the sides of said body, bars secured vertically to the sides of said body, said bars having hollow ribs thereon having sides provided with rectangular slots therein and also having sides provided with bayonet slots therein opening into the rectangular slots, and outwardly extending studs on the ends of the boards having enlarged heads insertible through said rectangular slots into said ribs to enter said studs in said bayonet slots for sliding along the latter to interlock the studs therewith.

2. The combination of claim 1, and angle bars extending along and fixed to the ends of the boards and carrying said studs and providing runners for sliding against the sides of said ribs having the bayonet slots therein.

3. The combination of claim 1, and a ledge extending along each horizontal bar supporting the runners.

4. Means for mounting boards in deck formation in a truck body having sides, said means comprising a pair of bars secured horizontally to the sides of the body, said bars having hollow ribs thereon having sides provided with rectangular slots therein and also having sides provided with bayonet slots therein opening into the rectangular slots, and outwardly extending studs on the ends of the boards insertible through said rectangular slots into said ribs to enter said studs into said bayonet slots for sliding along the latter to interlock the studs therewith.

5. The combination of claim 4 and angle iron bars extending along and fixed to the ends of the boards and carrying said studs and providing runners for sliding against the sides of said ribs having the bayonet slots therein.

6. The combination of claim 5, and a ledge extending along each first named bar for supporting the runners.

7. Means for mounting boards in deck formation in a truck body having sides, said means comprising a pair of bars secured horizontally to the sides of the body, said bars having hollow ribs thereon having sides provided with rectangular slots therein and also having sides provided with bayonet slots therein opening into the rectangular slots, outwardly extending studs on the ends of the boards having enlarged heads insertible through the rectangular slots to enter the studs in the bayonet slots for sliding along the latter to interlock the studs therewith, and a notched locking bar slidable in each rib in one direction to register its notches with said rectangular slots for insertion of said heads through said notches, said bars being slidable in the opposite direction to close said rectangular slots for locking the studs in the bayonet slots.

References Cited in the file of this patent

UNITED STATES PATENTS

| | | |
|---|---|---|
| 876,774 | Crepar | Jan. 14, 1908 |
| 2,129,438 | Nitsche | Sept. 6, 1938 |
| 2,336,440 | Kass | Dec. 7, 1943 |
| 2,616,375 | Nampa | Nov. 4, 1952 |